(12) United States Patent
Toms

(10) Patent No.: US 7,822,798 B2
(45) Date of Patent: Oct. 26, 2010

(54) DEAD RECKONING FOR COORDINATE CONVERSION

(75) Inventor: Ralph M. Toms, Tracy, CA (US)

(73) Assignee: SRI International, Menlo Park, CA (US)

( * ) Notice: Subject to any disclaimer, the term of this patent is extended or adjusted under 35 U.S.C. 154(b) by 1203 days.

(21) Appl. No.: 11/432,234

(22) Filed: May 11, 2006

(65) Prior Publication Data

US 2010/0241682 A1    Sep. 23, 2010

Related U.S. Application Data

(60) Provisional application No. 60/681,130, filed on May 13, 2005.

(51) Int. Cl.
*G06F 7/38* (2006.01)
(52) U.S. Cl. .................................... 708/442
(58) Field of Classification Search .................. 708/442
See application file for complete search history.

(56) References Cited

U.S. PATENT DOCUMENTS 5,986,604 A * 11/1999 Nichols et al. .............. 708/442
2008/0243984 A1 * 10/2008 Olsen ......................... 708/442

OTHER PUBLICATIONS

Toms, Ralph M.; "Efficient Procedures for Geodetic Coordinate Transformations"; Proceedings of the First National Meeting of the Military Applications Society (INFORMS); University of Alabama at Huntsville; May 19-21, 1998; Special Report No. 550-98-SR-53; http://www.sedris.org/download/documentation/compositeSR53.pdf.

Toms, Ralph M.; "New Efficient Procedures for Geodetic Coordinate Transformations"; SEDRIS Program; 11 pages, 1999.

Borenstein, J.; "Internal Correction of Dead-Reckoning Errors With the Smart Encoder Trailer"; International Conference on Intelligent Robots and Systems (IROS '94)—Advanced Robotic Systems and the Real World; Munich, Germany, Sep. 12-16, 1994; pp. 127-134.

Birkel, P.; "SEDRIS Geospatial Reference Model"; Jul. 10, 1997; 45 pages.

U.S. Congress; Office of Technology Assessment; "Distributed Interactive Simulation of Combat"; OTA-BP-ISS-151 (Washington, DC: U.S. Government Printing Office, Sep. 1995); 85 pages.

(Continued)

*Primary Examiner*—Tan V Mai
(74) *Attorney, Agent, or Firm*—Guerin & Rodriguez, LLP; Michael A. Rodriguez

(57) ABSTRACT

Novel methods for converting coordinates for a position from a first coordinate system into coordinates in a second coordinate system are provided. Linear approximations of trigonometric functions are used to calculate values for the trigonometric functions when a position to be converted is within an acceptable bound of a previous position and more precise values of the trigonometric functions are used to perform the conversion when the position to be converted is not within an acceptable bound of a previous position. The present invention can be advantageously utilized to reduce the computation load in a distributed simulation environment, such as a federation of distributed interactive simulations.

33 Claims, 5 Drawing Sheets

OTHER PUBLICATIONS

Lee, B. et al.; "Adaptive Dead Reckoning Algorithms for Distributed Interactive Simulation"; I.J. of Simulation; vol. 1, No. 1-2; pp. 21-34.

Toms, R. et al.; "Choosing a Coordinate Framework for Simulations"; 10 pgs.

Lehmer, R.D. et al.; "Distributed System Architecture in VAST-RT for Real-Time Airspace Simulation"; AIAA Modeling and Simulation Technologies Conference and Exhibit; Aug. 16-19, 2004; Providence, RI; AIAA 2004-5436; pp. 1-10.

Burtch, R.; "A Comparision of Methods Used in Rectangular to Geodetic Coordinate Transformations"; ACSM Annual Conference and Technology Exhibition; Orlando, FL; Apr. 21-26, 2006; 21 pages.

Gerdan, George P. et al.; "Transforming Cartesian Coordinates X, Y, Z to Geographical Coordinates"; The Australian Surveyor; vol. 44, No. 1; Jun. 1999; pp. 55-63.

* cited by examiner

DEAD RECKONING FOR COORDINATE CONVERSION

This application claims the benefit of the filing date of U.S. Provisional Application No. 60/681,130; filed May 13, 2005; entitled "SYSTEM AND METHOD FOR DEAD RECKONING FOR COORDINATE CONVERSION;" the entirety of which provisional application is incorporated herein by reference.

FIELD OF THE INVENTION

The present invention relates generally to efficiently and accurately converting coordinates from one coordinate system to another, wherein the conversions require computations of values for trigonometric functions. The present invention can be advantageously utilized, for example, in converting coordinates for a first coordinate system (e.g., a geodetic coordinate system) into coordinates for a second coordinate system (e.g., a geocentric coordinate system). Such coordinate conversions can be found, for example, in a federation of distributed interactive simulations.

BACKGROUND OF THE INVENTION

In many simulation applications one of the important factors impacting through-put processing time is the need to frequently compute coordinate conversions. This is particularly important in federations including constructive simulations, simulators, and live entities (e.g. vehicles and aircraft). Such federations require methods for informing all computational nodes in the federation of information such as the time, position, velocity, and acceleration state of every entity involved. This information is contained in an entity-state protocol-data-unit ("PDU"). Informing every node in a simulation system, such as a federation of interactive simulations, of instantaneous changes in every entity-state can saturate the communication system used for interchanging such information.

In dead-reckoning methods of the prior art, all entities in the system are assumed to move in accordance with a simple kinematics model, usually in a straight line in some common coordinate system. In this manner, nodes in a simulation system can quickly compute an approximate position for an entity over a time period without having to receive more precise or exact positions from the node responsible for keeping track of or computing the more precise or exact position of an entity (the "owning" node). When an entity maneuvers in such a way to significantly depart from the simple kinematics model the nodes in the system other than the owning node (i.e., the "non-owning" nodes) will have an insufficiently-accurate approximation of the entity's position so a new entity-state is sent by the owning node to all non-owning nodes. Each non-owning node receiving the new entity-state then re-initializes the entity's simple kinematics (or kinetics) model on the receiving node. In this way, all nodes in the system have the same dynamics model for each entity and a common basis for determining position, velocity, and acceleration for each entity. When an entity maneuver triggers the issuance of a new entity-state by the owning node, the entity is said to have exceeded its dead-reckoning bounds.

In the case of federations employing the Distributed Interactive Simulation ("DIS") IEEE Protocol Standard 1278, the common coordinate system ("CS") of the federation is the geocentric system based on the WGS 84 ellipsoid. An individual federation node can operate in any appropriate internal coordinate system. However, the node converts information to match the DIS protocol when communicating the information to another node in the federation by sending a PDU. In such a case, the computational node (or owning node) converts entity-state data to the geocentric system prior to communicating the converted data to non-owning nodes. Conversely, when a non-owning node receives data from an owning node, the received data will be in geocentric coordinates and is converted to the internal coordinate system employed by the receiving (i.e., non-owning) node. If there are many maneuvering entities in the simulation system the networking system may become saturated with PDUs and significant latencies may occur. Additionally, the computer time needed to perform the conversions both to and from the geocentric coordinate system is a significant contributor to the latency problem.

The requirement to frequently perform coordinate conversions has a significant impact on the computer processing time within each node. It is important to use the most efficient conversion methods available. However, at the same time the accuracy of the conversion should be at a level that does not negatively impact the overall validity of the simulation.

SUMMARY OF THE INVENTION

The present invention can be advantageously utilized to reduce the computational load in a simulation system, such as a federation of distributed interactive simulations. The present invention provides methods for converting coordinates for an entity's position from a first coordinate system (e.g., geodetic) into coordinates in a second coordinate system (e.g., geocentric). An entity can be implemented in hardware, such as a vehicle or aircraft, or may be simulated as can be implemented on a node in a distributed simulation, for example. Conversions in accordance with the present invention require values of trigonometric functions to be calculated. It is known in the art that calculations of trigonometric functions are computationally expensive and simulations may require many trigonometric-function calculations. The present invention exploits an observation that the longitude and latitude are generally slowly-varying functions with respect to the simulation time increments. The present invention uses linear approximations of the required trigonometric functions to calculate values for the trigonometric functions when the longitude and latitude of an updated position is within an acceptable bound of the longitude and latitude of a previous position and uses more-precise values of the trigonometric functions to perform the conversion when the longitude and latitude of the updated position is not within an acceptable bound of the longitude and latitude of previous position. The acceptable bounds for longitude and latitude are fixed values in radians. The use of linear approximations of trigonometric function values can save significant computational resources in large and complex simulations.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION OF THE INVENTION

Figure 1:
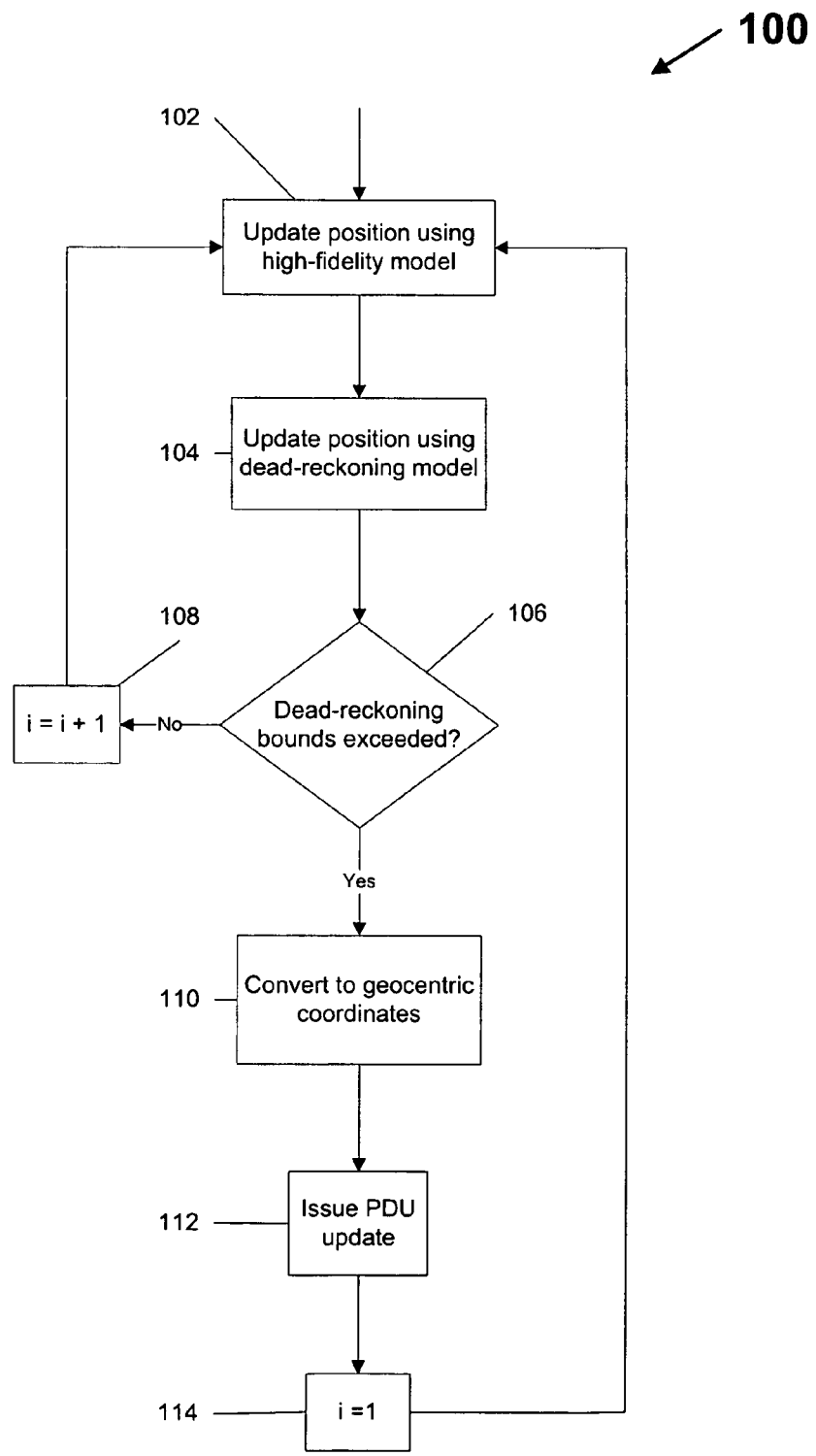
FIG. 1 illustrates an embodiment of a dead-reckoning process.

The present invention will be described in some detail in the context of coordinate conversions, especially as required in a federation of distributed interactive simulations. However, it should be understood that the present invention can be advantageously utilized in other compute-intensive applications as well.

The majority of vehicular systems include hardware actuators that control the function of the system. The system may be steering a vehicle, controlling engine speed, minimizing fuel consumption, navigating, delivering weapons and a host of other physical actions. The majority of such systems derive most of their control commands from one or more computers embedded in the system. Such systems often require position, velocity, and acceleration in some Earth-based coordinate system. The control functions are simulated in near real time using physics models to extrapolate a state at one time to a future state. These can be complex models that account for the effects of gravity, atmosphere, radiation effects on communications, terrain intervisibility, weather, and many other environmental factors. Such complex models must be computed fast enough so that the system can safely and accurately react to commands. Similar applications involve the simulation of the control models in a distributed federation of computers. The federation may include both live and simulated assets (i.e., entities). In these or similar applications the need for accurate but efficient computing of physical models is important to safety, cost, and mission performance.

A principal limitation to efficient computation is a need to perform computationally-expensive coordinate conversions to associate Earth positions with vehicle positions and with the environment. In some federations it is estimated that approximately twenty percent of the overall processing time is devoted to coordinate conversions. This is particularly important in federations of constructive simulations, simulators, and live entities where hundreds of thousands of system models may be involved. A federation of this type requires a method for informing all computational nodes in the system of the time, position, velocity, and acceleration state of every entity involved. Such data is often referred to as time-space-position-information ("TSPI") and may even include data about vehicle orientation. The TSPI is included in an entity-state protocol-data-unit ("PDU") for communication over a network to other federation nodes. It should be noted that although nodes in a simulation system will typically execute on separate computer systems that communicate over a network, it is herein contemplated that nodes in a simulation system may be implemented so that the nodes can either execute on separate computer systems or can execute on a single computer system. Additionally, it is herein contemplated that a single node in a simulation system may be implemented such that the node can execute on multiple computer systems. In this manner, a node in a simulation system as referred to herein comprises one or more computer systems. The entity-state PDU formats are usually those defined in the IEEE Standard 1278. When a federation employs the Distributed Interactive Simulation (DIS) IEEE Protocol Standard 1278, the common coordinate system of the federation is the geocentric system based on the WGS 84 ellipsoid. That is, the TSPI in the protocol is in geocentric WGS 84 coordinates (x, y, z). An individual federation node can operate in any appropriate internal coordinate system but converts TSPI to geocentric coordinates to match the DIS protocol requirement. Conversely, when receiving TSPI data from another node, it will be in geocentric coordinates and is converted to the internal coordinate system employed by the receiving node. If there are many maneuvering entities in the system, the networking system may become saturated with PDUs and significant latencies may occur. The computational load, due to the repeated coordinate conversions, also significantly limits the process and exacerbates the latency problem. To reduce the computational load, the conversions can be done faster or the number of entities in the system reduced. Reducing the number of entities involved is not a good option since it reduces the fidelity of the process. It is desirable to use the most efficient conversion methods available. However, at the same time the accuracy of the conversion should be at a level that does not impact the overall validity of the simulation. In some simulations, no more than a centimeter of approximation error in position can be tolerated with 1 mm being a more desirable goal. To inform every node of the system of instantaneous changes in entity-states would saturate the communication network. To reduce this load on the communication network to a practical level, a method called Dead Reckoning is typically utilized. There are a number of dead-reckoning algorithms of differing orders of accuracy that are in current use.

To illustrate the dead-reckoning concept a simple example is used. Model entities are uniquely assigned to a particular node (i.e., the hardware and software for implementing the model) in a federation and are referred to as being owned by that node. A software implementation (i.e., the simulation) of an entity's dynamics model is used to extrapolate TSPI in time for each owned entity. The simulation uses a coordinate system convenient for the type of motion that is being modeled and may be simple or complex. This coordinate system will be referred to herein as the internal or native coordinate system. The simulation employs short steps in time to update the motion starting at some initial reference time. In each time-step of the simulation the entity's model is updated producing new TSPI for the entity's model. It should be noted, that this TSPI is an approximation of the model at a given point in time. The approximation may be either a precise (or high-fidelity) approximation or a less-precise approximation depending on the method(s) used to update the entity's model at each time-step. At each time-step, the simulation extrapolates the motion (i.e., updates the TSPI) in the native coordinate system using a high-fidelity method of approximation. By high-fidelity it is meant herein that the extrapolation method produces approximations that are sufficiently precise for the purposes of the simulation. At each time-step, the simulation also extrapolates the motion by a simpler (and faster) dead-reckoning motion model. Thus, at each time step in the simulation of an entity, the simulation updates the entity's TSPI using both a high-fidelity model and a dead-reckoning model. This is done repeatedly over time from some reference time. Both the high-fidelity update and the dead-reckoning update are approximations of the underlying model. In general, the high-fidelity update is a more precise (i.e., more accurate) update than the dead-reckoning update. However, the high-fidelity update is also a more timeconsuming update to compute. Another way of expressing this is to say that the high-fidelity update is more costly to compute.

The TSPI for the high-fidelity update and the dead-reckoning update are compared to each other. If the TSPI for the dead-reckoning update is in some acceptable region of the high-fidelity update in the model's internal coordinate system, the time step is incremented and the process continues without sending an updated PDU to other nodes in the distributed simulation. It should be noted that other nodes (i.e., the non-owning nodes) will update the entity's TSPI using the same dead-reckoning update that is performed on the owning node. In this manner, all nodes have the same dead-reckoning approximation of the entity's TSPI. The acceptable region is defined mathematically and is called the dead-reckoning bound. Methods for determining an appropriate dead-reckoning bound are known in the art and may vary from application to application of the present invention. When the dead-reckoning update of the TSPI is outside the acceptable region it is said to exceed the dead-reckoning bound. If the dead-reckoning bound is exceeded at any time step, the high-fidelity TSPI is converted from internal coordinates to geodetic coordinates and then converted to geocentric coordinates. The geocentric coordinates are sent in an entity-state PDU to the communication network. All nodes, including the sending node, then update the TSPI in their dead-reckoning model. In essence, when an entity maneuvers too much away from a simple path as determined by comparing the position of the entity as determined by a high-fidelity model of the entity with a position as determined by a dead-reckoning model of the entity, the owning node sends a high-fidelity TSPI update of the entity and all nodes update their local value of the entity's TSPI, effectively updating their dead-reckoning model of the entity.

An example of a dead-reckoning process 100 executing on an owning node in a simulation system is illustrated in FIG. 1, wherein i represents the number of the current time-step. It should be noted that in FIG. 1 the time-step index is reset to 1 whenever a high-fidelity PDU is issued (i.e., sent to other nodes). Prior to step 102 any needed system initialization can be performed. In step 102, the position of an entity in the internal CS is updated using a high-fidelity model for the entity. In step 104, the dead-reckoning model for the entity is used to update the position in the internal CS. In step 106, it is determined whether the position of the entity according to the updated dead-reckoning model has exceeded the dead-reckoning bounds in the internal CS. If the dead-reckoning bounds has not been exceeded, the process 100 proceeds to step 108, wherein the number of the time step is incremented, and then returns to step 102. If the dead-reckoning bounds has been exceeded, then the non-owning nodes in the system need to have the position of the entity updated. At this point, the process 100 proceeds to step 110, wherein the coordinates from the high-fidelity update are converted to geocentric coordinates, and then a PDU update is issued in step 112 to send the geocentric coordinates of the updated position to non-owning nodes so that the non-owning nodes can update the position of the entity in their dead-reckoning models. The time-step number is reset to 1 in step 114 and then the process 100 returns to step 102.

When entities are not moving or not maneuvering far enough from the simple update model (e.g. the dead-reckoning model), entity-state PDUs are generally not issued. An exception is the regular or periodic issuance of what is referred to as a heartbeat PDU. One reason for a node to not issue a PDU is because the node's computer may have failed. To take appropriate action when a failure occurs, a heartbeat PDU is sent on some time interval much larger than the nominal time-step. Other nodes on a distributed simulation know, that if a heartbeat PDU is not received from a particular node, then that particular node is not working. Typically, the heartbeat interval is every five seconds.

In a federation it is rare that a node would use geocentric coordinates as its internal coordinate system. Sometimes a coordinate system is used that is based on a map projection. A map projection is a mathematical mapping of a portion of the surface of an ellipsoid of revolution onto a plane and is inherently two-dimensional. To provide a third dimension a vertical axis is introduced. The 3-D orthogonal systems generated in this way are referred to as augmented map projections. Such systems distort geometric quantities and the use of Maxwell's equations is problematical. In spite of these shortcomings, augmented forms of the Universal Transverse Mercator ("UTM") and Lambert conformal conic are still used for coordinate systems in most legacy simulations. As the shortcomings of these has been recognized, there has been a trend to use real world coordinate systems that do not distort geometry, notably the U.S. Army is developing high resolution simulations in what is called the Global Coordinate System (GCS). GCS is a set of north-oriented local tangent plane coordinate systems located on the surface of the ellipsoidal Earth reference model. A grid of one degree latitude by one degree longitude cellular sub-regions is defined. This generates a set of cells in latitude and longitude that are approximately rectangular near the equator and less so near the poles. The origin of each GCS coordinate system is at the center of each cell.

Figure 2:
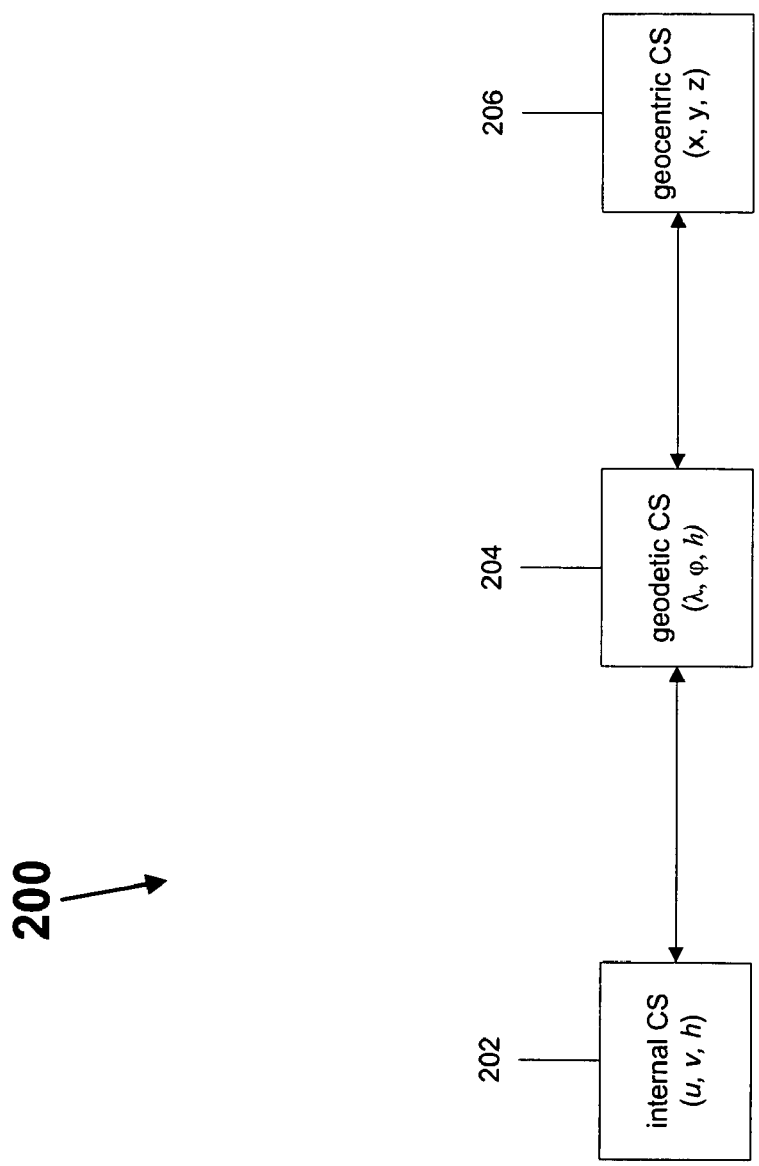
FIG. 2 illustrates forward and reverse conversions of coordinates required in a typical distributed interactive simulation.

When an entity-state PDU ("PDU update") is to be issued, entity-state information used by a federation node requires conversion from the simulation's internal coordinate system on the issuing node (i.e., the owning node) to geodetic coordinates ($\lambda$, $\phi$, h), where $\lambda$ is longitude, $\phi$ is latitude and h is ellipsoidal height. The ordering of the components in the 3-tuple is consistent with a right-handed coordinate system. The geodetic coordinates are then converted to geocentric coordinates to populate the position field of the entity-state PDU. Conversely, nodes receiving entity-state updates (i.e., non-owning nodes) will have to convert these to geodetic coordinates and then to the node's internal coordinate system. This is illustrated in FIG. 2, where the double arrow indicates that conversions 200 go in both directions, forward from internal CS 202 to geodetic CS 204 to geocentric CS 206 and reverse from geocentric CS 206 to geodetic CS 204 to internal CS 202.

The conversion from geodetic ($\lambda,\phi,h$) to geocentric coordinates (x,y,z) is given by $$x = (R_N(\phi)+h)\cos(\phi)\cos(\phi)$$

$$y = (R_N(\phi)+h)\cos(\phi)\sin(\phi)$$

$$z = ((1-\epsilon^2)(R_N(\phi)+h)\sin(\phi) \quad (1)$$

where $$R_N(\phi) = \frac{a}{\sqrt{(1-\varepsilon^2 \sin^2(\phi))}} \quad (2)$$

and a is the semi-major axis of the Earth reference ellipsoid and E is the eccentricity. Each conversion requires the computation of both (1) and (2). The trigonometric terms are by far the most costly in terms of computer time needed to determine the value of these terms.

Conversion of TSPI from the internal coordinate system all the way to the geocentric coordinate system takes a significant amount of computer time due to the geodetic to geocentric conversion. Each conversion requires the computation of both (1) and (2). That this conversion is expensive in terms of computer time should be clear especially when this conversion may have to be done for thousands of entities. Examination of the forward conversion shows that a major portion of the execution time will be caused by the need for the four trigonometric function evaluations (i.e., $\sin(\lambda)$, $\cos(\lambda)$, $\sin(\phi)$, and $\cos(\phi)$) in converting a position expressed in geodetic coordinates to the position expressed in geocentric coordinates. A single calculation of a value for a trigonometric function (e.g., a trig-function call on a node's computer) can take the time equivalent to perform 12 to 45 floating point operations depending on the particular computer system being used. There are four trigonometric-function calls per conversion so that the computer time needed is equivalent to 48 to 180 floating point operations. In addition, there are two trigonometric-function calls involving the foot-point latitude, which brings the total equivalent floating point operations to 72 to 270 per conversion. Thus, the trigonometric terms are by far the most costly in terms of computer time. The reverse conversion of geocentric coordinates to the internal coordinate system is similarly costly in terms of computer time. The present invention can be advantageously utilized to ease this computational load in either direction.

The present invention utilizes an observation that, while the internal coordinates may be rapidly varying, the corresponding latitude and longitude are slowly varying. It is important to observe that, at typical update rates, a particular entity cannot move very far (i.e., in longitude and latitude) between updates. As a result, the corresponding geodetic coordinates do not change much. This suggests that local linear updates to latitude, longitude, and geodetic height may be possible without undue approximation error. For the angular data (i.e., longitude and latitude) this is equivalent to the use of small angle approximations to compute the trigonometric functions involved. Some care should be taken in assessing and using such an approach form application to application in that the approximation error is multiplied by the curvature, which is as large as the semi-major axis of the Earth reference ellipsoid. This product should be acceptably small before this approach can be used in a given application.

A simple example is provided to illustrate the notion that the geodetic coordinates are slowly varying. Assume an armored vehicle moves at a constant 30 MPH due north in an augmented UTM ("AUTM") based coordinate system. The Earth reference model from which the UTM is projected is taken to be a sphere of radius 6371000.0 meters. The initial longitude and latitude ($\lambda$, $\phi$) in geodetic coordinates is $$\left(0, \frac{\pi}{4}\right).$$

The distance traveled (in UTM) in one second in the north direction is 44 feet or about 13.7 meters. For such a short distance the arc distance is nearly indistinguishable from the 13.7 meter straight-line distance in UTM coordinates. Using the relation $R = s\theta$ the change in angle $\delta$ is $$\delta \approx 13.7/R = 0.00000215037 \text{ radians}.$$

From this $$\sin\left(\frac{\pi}{4}\right) = \cos\left(\frac{\pi}{4}\right) = .707106781187$$

$$\sin\left(\frac{\pi}{4} + \delta\right) = .707108301725$$

$$\cos\left(\frac{\pi}{4} + \delta\right) = .707105260645$$

From these $$y_{i+1} = R\cos\left(\frac{\pi}{4}\right) = 4504967.61556618$$

The sine (S) and cosine (C) satisfy the differential equations $$dS/dt = C$$

$$dC/dt = -S$$

Numerical integration of the differential equations using Euler's method yields, $$S_{i+1} \approx S_i + \delta C_i$$

$$C_{i+1} = C_i - \delta S_i$$

Using this result to approximate $y_i$ by $Y_i$ yields $$Y_{i+1} = R\cos\left(\frac{\pi}{4} + \delta\right) \approx R\left(\cos\left(\frac{\pi}{4}\right) - \delta\sin\left(\frac{\pi}{4}\right)\right) = R(C_i - \delta S_i) = 4504967.61557659$$

and the error is given by $$E = y_{i+1} - Y_{i+1} = -0.00001042 \text{ meters}.$$

This example illustrates that using the linear or Euler method to update the sine and cosine instead of computing the exact (or at least more precise) sine and cosine induces a small error. There is a considerable reduction in percent processing time when using this simplified method for computing the trigonometric functions. The same kind of computational time saving can also be anticipated for the trigonometric terms of the longitude.

For the above scenario, if an entity moved 100 meters between updates the absolute error would be 0.00055 meters (about half a mm). As previously discussed, all distributed simulations have a heartbeat update, wherein the entity-state PDU is issued regardless of whether or not it has exceeded its dead reckoning bounds. Typically this heartbeat rate is 5 seconds, which corresponds to 220 feet for this example. The approximation error in this case is about 2.7 mm.

The entity dead-reckoning process computes entity-state information by time-stepped dynamic equations. After each time step, the entity-state vectors are compared to dead-reckoning bounds. If the updated entity-state vectors meet the bounds the simplified results are retained and used to update the entity-state. This occurs at every computational node that is simulating a particular entity. When the dead-reckoning bounds are exceeded, the appropriate coordinate conversion is computed to populate the entity-state PDU with TSPI for transmitting to other federation nodes. The other nodes re-initialize the simplified dead-reckoning dynamics computations to this new information. The dead-reckoning bounds for this process are referred to herein as entity dead-reckoning bounds. In essence, the dead-reckoning process sequentially updates the entity-state from the previous state as long as the entity dead-reckoning bounds are not exceeded.

To help illustrate preferred embodiments of the present invention, the following example conversions are provided. The first sample involves a forward conversion of internal coordinates (u, v, h) in an augmented UTM ("AUTM") coordinate system to geodetic coordinates ($\lambda$, $\phi$, h) and then converting the geodetic coordinates ($\lambda$, $\phi$, h) to geocentric coordinates (x, y, z). The second sample involves a reverse conversion of geocentric coordinates (x, y, z) to geodetic coordinates ($\lambda$, $\phi$, h) and then converting the geodetic coordinates ($\lambda$, $\phi$, h) to the internal AUTM coordinates (x, y, z).

Example Conversion 1: AUTM to Geodetic to Geocentric (Forward Conversion)

The owning node of an entity is assumed to operate in an AUTM coordinate system. Updated positions in this system are generated using the systems internal time-stepped model for motion. Each time-step produces a point expressed in internal coordinates (u, v, h). If this point does not exceed the dead-reckoning bounds, the time step is incremented and a new point is computed. When the bound is exceeded then the last accepted point is converted to geodetic coordinates ($\lambda$, $\phi$, h) and then to WGS 84 geocentric coordinates (x, y, z). The compute intensive portion of the conventional forward conversions consist of:

AUTM to geodetic, (u, v, h) to ($\lambda$, $\phi$, h):

$$\phi = f - \frac{R_N(f)\sin(f)}{R_M(f)\cos(f)}\left(\frac{1}{2}\left(\frac{u}{R_N(f)}\right)^2 - \frac{A}{24}\left(\frac{u}{R_N(f)}\right)^4 + \frac{B}{720}\left(\frac{u}{R_N(f)}\right)^6\right)$$

$$\Lambda = \frac{1}{\cos(f)}\left(\frac{u}{R_N(f)} - \frac{C}{6}\left(\frac{u}{R_N(f)}\right)^3 + \frac{D}{120}\left(\frac{u}{R_N(f)}\right)^5\right)$$

$$R_N(f) = \frac{a}{\sqrt{1-\varepsilon^2\sin(f)}}$$

$$R_M(f) = \frac{(1-\varepsilon^2)}{a^2}(R_N(f))^3$$

where f is the foot-point latitude. The foot-point latitude is computed from the rectifying latitude $\mu$, which is defined by, $$\mu = \frac{S(\phi) + \frac{u}{k_o}}{aB_0(1+n)}$$

$$S(f) = a(1-\varepsilon^2)(A\phi + \sin(f)\cos(f)(B + C\sin^2(f) + D\sin^4(f)))$$

where a,$\varepsilon$,n,$B_0$,B, C and D are constants associated with the oblate ellipsoid. The constant $k_o$ is the scale factor and S(f) is the arc length from the equator to the foot-point latitude f.

The forward conversion from the resulting geodetic point ($\lambda$, $\phi$, h) to the corresponding geocentric point (x, y, z) is done by using (1) and (2). That is $$x = (R_N + h)\cos(\phi)\cos(\lambda)$$

$$y = (R_N + h)\cos(\phi)\sin(\lambda).$$

$$z = ((1-\varepsilon^2)(R_N + h)\cos(\phi)$$

where all symbols have been defined above.

Example Conversion 2: Geocentric to Geodetic to AUTM (Reverse Conversion)

The conversion from geocentric coordinates to geodetic coordinates is generally a complex iterative scheme. This conversion is known in the art and is taught in *Efficient Procedures for Geodetic Coordinate Transformations*, Toms, Ralph M., Proceedings of the First National Meeting of the Military Applications Society (INFORMS), University of Alabama at Huntsville, Huntsville (Ala.): INFORMS, 1998, the contents of which are hereby incorporated by reference. This case occurs when a non-owning node receives a PDU update from an owning computational node in the federation. When the coordinate dead-reckoning bounds are exceeded the known iterative method will have to be used. When the coordinate dead-reckoning bounds are not exceeded, the slowly varying property of the longitude and latitude can be exploited to achieve an accurate and efficient conversion of $(x_{i+1}, y_{i+1}, z_{i+1})$ to $(\lambda_{i+1}, \phi_{i+1}, h_{i+1})$.

By assumption, the $i^{th}$ values of the longitude and latitude and corresponding trig-function values are available (stored) for a particular non-owned entity. Since the angular data is slowly changing, it is sufficient to use simple iteration to compute an accurate estimate of $\tan(\phi_{i+1})$. That is $$\tan(\phi_{i+1}) = \frac{z_i + \varepsilon^2 R_N(\phi_i)\sin(\phi_i)}{w_i} \quad (4)$$

where $$w_i = \sqrt{x_i^2 + y_i^2}$$

and $R_N(\phi)$ and $\varepsilon$ were defined above. For a small difference $\phi_{i+1} - \phi_i$ the following are also used:

$$\tan(\phi_{i+1} - \phi_i) = \phi_{i+1} - \phi_i = \delta_{i+1} \quad (5)$$

and from trigonometric identities, $$\tan(\phi_{i+1} - \phi_i) = \frac{(\tan(\phi_{i+1}) - \tan(\phi_i))}{1 - \tan(\phi_{i+1})\tan(\phi_i)} \quad (6)$$

$$\tan(\phi_i) = \frac{\sin(\phi_i)}{\cos(\phi_i)}.$$

From (5) and (6), $$\delta_{i+1} = \phi_{i+1} - \phi_i = \frac{\cos(\phi_i)\tan(\phi_{i+1}) - \sin(\phi_i)}{\cos(\phi_i) - \tan(\phi_{i+1})\sin(\phi_i)} \quad (7)$$

The sine and cosine satisfy the differential equations $$\frac{d\sin(x)}{dx} = \cos(x) \quad (8)$$

-continued $$\frac{d\cos(x)}{dx} = -\sin(x)$$

When the change in x, (Δx) is small Euler's method can be used to update the trigonometric functions over a step size of Δx. That is:

$$\sin(x_{i+1}) = \sin(x_i) + \Delta x \cos(x_i)$$

$$\cos(x_{i+1}) = \cos(x_i) - \Delta x \cos(x_i) \quad (9)$$

Using (9) with $\phi_i$ and $\delta_{i+1}$ yields, $$\sin(\phi_{i+1}) = \sin(\phi_i) + \delta_{i+1} \cos(\phi_i)$$

$$\cos(\phi_{i+1}) = \cos(\phi_i) - \delta_{i+1} \cos(\phi_i) \quad (10)$$

This completes the conversion for latitude.

Longitude is given by.

$$\tan(\lambda) = \frac{z}{w}$$

$$w = \sqrt{x^2 + y^2}.$$

For a given point $(x_{i+1}, y_{i+1}, z_{i+1})$ a small angle formulation yields, $$\tan(\lambda_{i+1} - \lambda_i) = \lambda_{i+1} - \lambda_i = \Lambda_{i+1} = \frac{z_{i+1}}{w_{i+1}}.$$

and $$\lambda_{i+1} - \lambda_i = \lambda + \frac{z_{i+1}}{w_{i+1}}. \quad (11)$$

Equations (9) for longitude yield, $$\sin(\lambda_{i+1}) = \sin(\lambda_i) + \cos(\lambda_i)$$

$$\cos(\lambda_{i+1}) = \cos(\lambda_i) - \sin(\lambda_i) \quad (12)$$

This completes the formulation for longitude.

The geodetic height is given by, $$h_{i+1} = \frac{w_{i+1}}{\cos(\phi_{i+1})} - \frac{a}{\sqrt{1 - \varepsilon^2 \sin^2(\phi_{i+1})}} \quad (13)$$

when $\phi_{i+i} \geq \frac{\pi}{4}$ and $$h_{i+1} = \frac{z_{i+i}}{\sin(\phi_{i+i})} + \frac{a(\varepsilon^2 - 1)}{\sqrt{1 - \varepsilon^2 \sin^2(\phi_{i+i})}} \quad (14)$$

when $\phi_{i+i} < \frac{\pi}{4}$.

The geodetic coordinate is then $(\lambda_{i+1}, \phi_{i+1}, h_{i+1})$. The conversion for $(x_{i+1}, y_{i+1}, z_{i+1})$ to $(\lambda_{i+1}, \phi_{i+1}, h_{i+1})$ is used when the coordinate dead-reckoning bounds are exceeded. However, when these bounds are not exceeded the conversion is given by equations (11) through (14).

The conversion from $(\lambda_{i+1}, \phi_{i+1}, h_{i+1})$ to the internal coordinate system, in this case AUTM, is given by, $$u = \frac{R_N \Lambda \cos(\phi_{i+1})}{6}(6 + \Lambda^2(2\cos^2(\phi_{i+1}) + \varepsilon'^2 \cos^4(\phi_{i+1}) - 1))$$

$$v = S(\phi_{i+1}) + \frac{R_N \Lambda^2}{4} \sin(\phi_{i+1})\cos(\phi_{i+1})(2 +$$

$$\Lambda^2(6\cos^2(\phi_{i+1}) + 9\varepsilon'^2 \cos^4(\phi_{i+1}) + 49\varepsilon'^4 \cos^6(\phi_{i+1}))$$

where $$R_N = \frac{a}{\sqrt{1 - \varepsilon^2 \sin^2(\phi_{i+1})}}$$

$$S = a(1 - \varepsilon^2)(A\phi_{i+1} + \sin(\phi_{i+1})\cos(\phi_{i+1})(B + C\sin^2(\phi_{i+1}) + D\sin^4(\phi_{i+1})))$$

$$\Lambda = \lambda_{i+1} - \lambda_{origin}$$

and where a,ε,ε',A,B,C and D are constants associated with a specific oblate ellipsoid model of the Earth. Once again the sine and cosine terms dominate the conversion with respect to computer time.

For each entity, let j=1, 2, 3, . . . be the index of a point in time where an entity-state PDU is issued. The time difference between the $j^{th}$ time and the j+1 time is not a constant but depends on the maneuver intensity of the entity. Between the $j^{th}$ time and the j+1 time there may be I time steps numbered with the index i=1, 2, 3, . . . I where as noted I is not a constant. When a PDU is issued, the time $t_I$ and $t_j$ are coincident. The last valid point of the time step process occurs at $t_I$. This means that during the I+1 time step, that the dead-reckoning bounds of the movement model were exceeded. As a result the system uses the data at $t_I$ to generate the TSPI at $t_j$. When this is finished the time step process restarts at i=1 (see FIG. 1).

Figure 3:
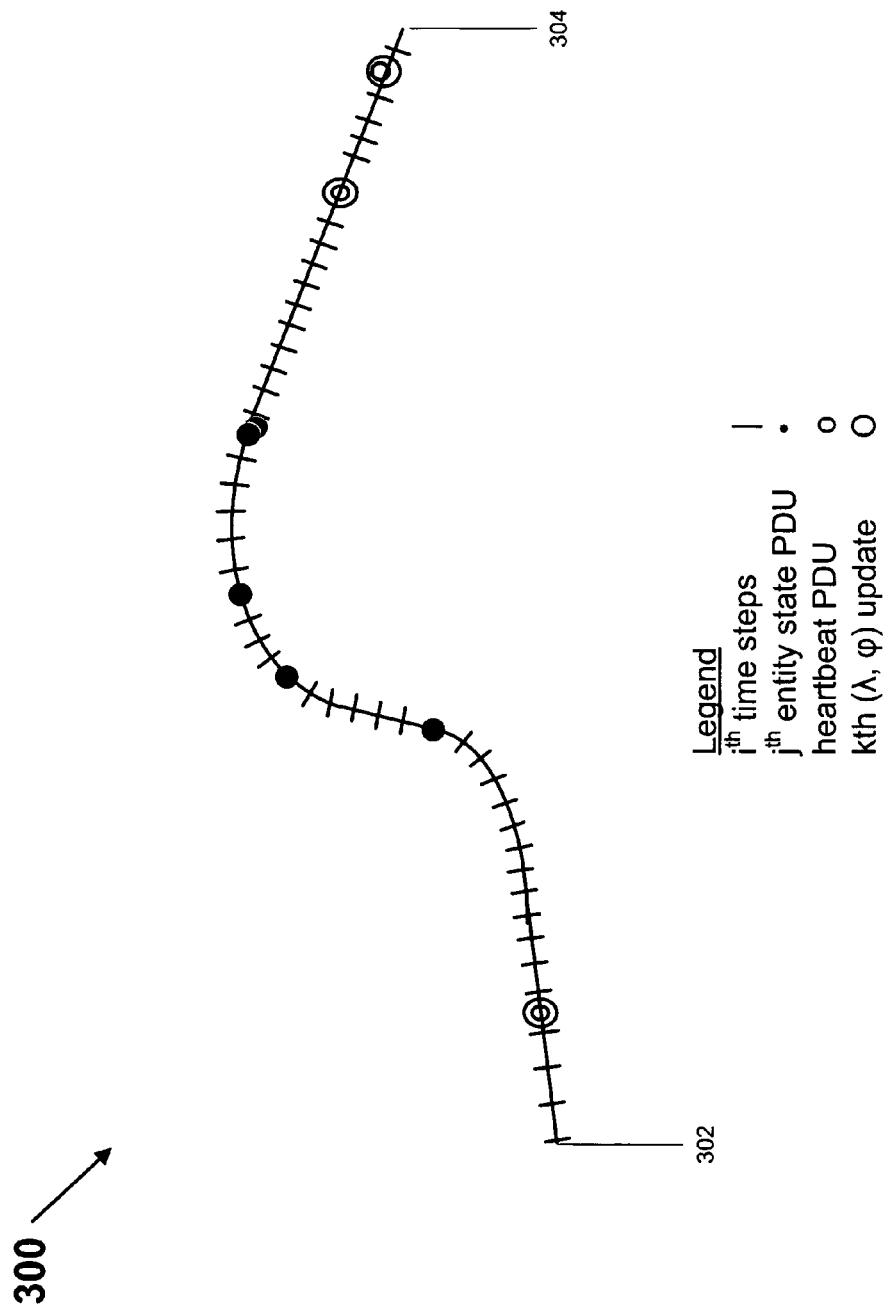
FIG. 3 illustrates the path of an entity in relation to simulation time-steps and PDU updates.

Since the longitude and latitude are slowly changing, the trigonometric functions can be updated less frequently than the PDU updates. Let k=1, 2, 3, . . . be the index of the time where the trigonometric functions need to be updated (geodetic coordinate update). This occurs when the coordinate dead-reckoning bounds are exceeded. A conceptual view of the occurrence of all four types of time points (time-step, PDU issuance, heart beat PDU, and geodetic coordinate update) is shown in FIG. 3. FIG. 3 illustrates the path of an entity in relation to simulation time-steps and PDU updates. In FIG. 3, the entity proceeds from a first point 302 to a second point 304 with updates being issued at various points along the way. At each geodetic coordinate update the $k^{th}$ values of the angular data are saved for use at the k+1 update.

Figure 4:
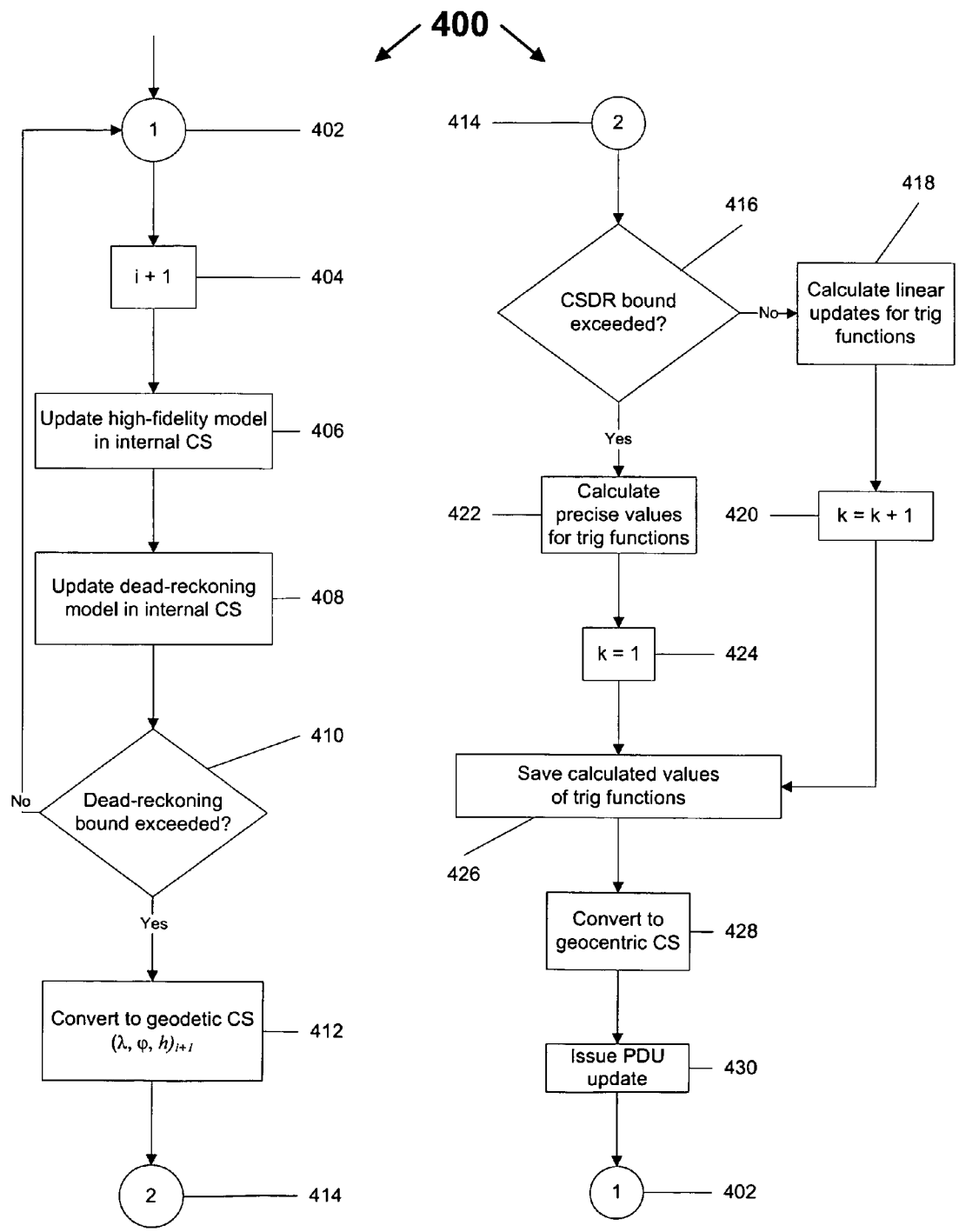
FIG. 4 shows a flowchart illustrating a forward conversion of coordinates in accordance with the present invention.

FIG. 4 shows a flowchart that illustrates an example process 400 of the present invention that can be advantageously utilized on an owner node in a system for distributed simulation, for example. In FIG. 4, i indicates the number of the current time-step. Prior to step 402, any system initialization that is needed can be performed. At step 402, the node may perform any operations that may be necessary between time-steps. At step 404, the number of the time-step is incremented. At step 406, the high-fidelity model is updated in the internal coordinate system. That is, the high-fidelity model is used to approximate the position of an entity at time-step number i+1. At step 408, the dead-reckoning model is updated in the internal coordinate system. That is, the dead-reckoning model is used to generate a second approximation of the entity's position at time-step number i+1. In step 410, the two position approximations (i.e., high-fidelity and dead-reckoning) are compared to determine whether the dead-reckoning approximation is outside of or exceeds the dead-reckoning bounds. If the dead-reckoning bounds has not been exceeded, the process 400 returns to step 402 and the next time-step can proceed. However, if the dead-reckoning bounds has been exceeded in step 410, then the dead-reckoning approximation is reset to equal the high-fidelity approximation and the high-fidelity approximation of the entity's position is converted to geodetic coordinates $(\lambda_{i+1}, \phi_{i+1}, h_{i+1})$ in step 412.

In step 414, any needed system processes can be performed prior to converting the geodetic coordinates to geocentric coordinates. In step 416, a coordinate-system dead-reckoning ("CSDR") bound test is performed. That is, in step 416, it is determined whether the coordinates for the position are within a predetermined bound. In the CSDR bound test, the current values of longitude and latitude received are compared to previously-saved values of longitude and latitude to determine whether they are sufficiently different (i.e., whether the CSDR bound is exceeded). The present invention anticipates that the particular method for determining whether the current values of longitude and latitude are sufficiently different may vary between embodiments of the present invention depending on the particular application in which the present invention is utilized. One example would be to determine whether the difference between the sum of the saved values for $\lambda$ and $\phi$ and the sum of the received values for $\lambda$ and $\phi$ is greater than a predetermined value D. If the current geodetic coordinates do not exceed the CSDR bound then the process 400 proceeds to step 418, wherein the values of trigonometric functions (e.g., $\sin(\phi)$, $\cos(\phi)$ $\sin(\lambda)$, and $\cos(\lambda)$) needed for the conversion are calculated from saved values of the trigonometric functions using linear approximations of the trigonometric functions. In step 420, the value of k is incremented and the process 400 proceeds to step 426. If the current geodetic coordinates exceed the CSDR bound in step 416, then the process 400 proceeds to step 422, wherein values of trigonometric functions (e.g., $\sin(\phi)$, $\cos(\phi)$, $\sin(\lambda)$, and $\cos(\lambda)$) are calculated using the received values for $\lambda$ and $\phi$ and precise approximations of the trigonometric functions. The precise approximations will typically be standard trigonometric function calls on the node's computer using the received values for $\lambda$ and $\phi$ as parameters. After completion of step 422, the value of k is reset to 1 in step 424. After step 424, the process 400 proceeds to step 426. In step 426, the calculated values of $\sin(\phi)$, $\cos(\phi)$, $\sin(\lambda)$, and $\cos(\lambda)$ as well as the received values of $\lambda$ and $\phi$ are saved to be used, if needed, in the next conversion from geodetic coordinates to geocentric coordinates. After step 426, the process 400 proceeds to step 428, wherein a PDU update containing the geocentric coordinates are sent out to other nodes in the simulation system.

Figure 5:
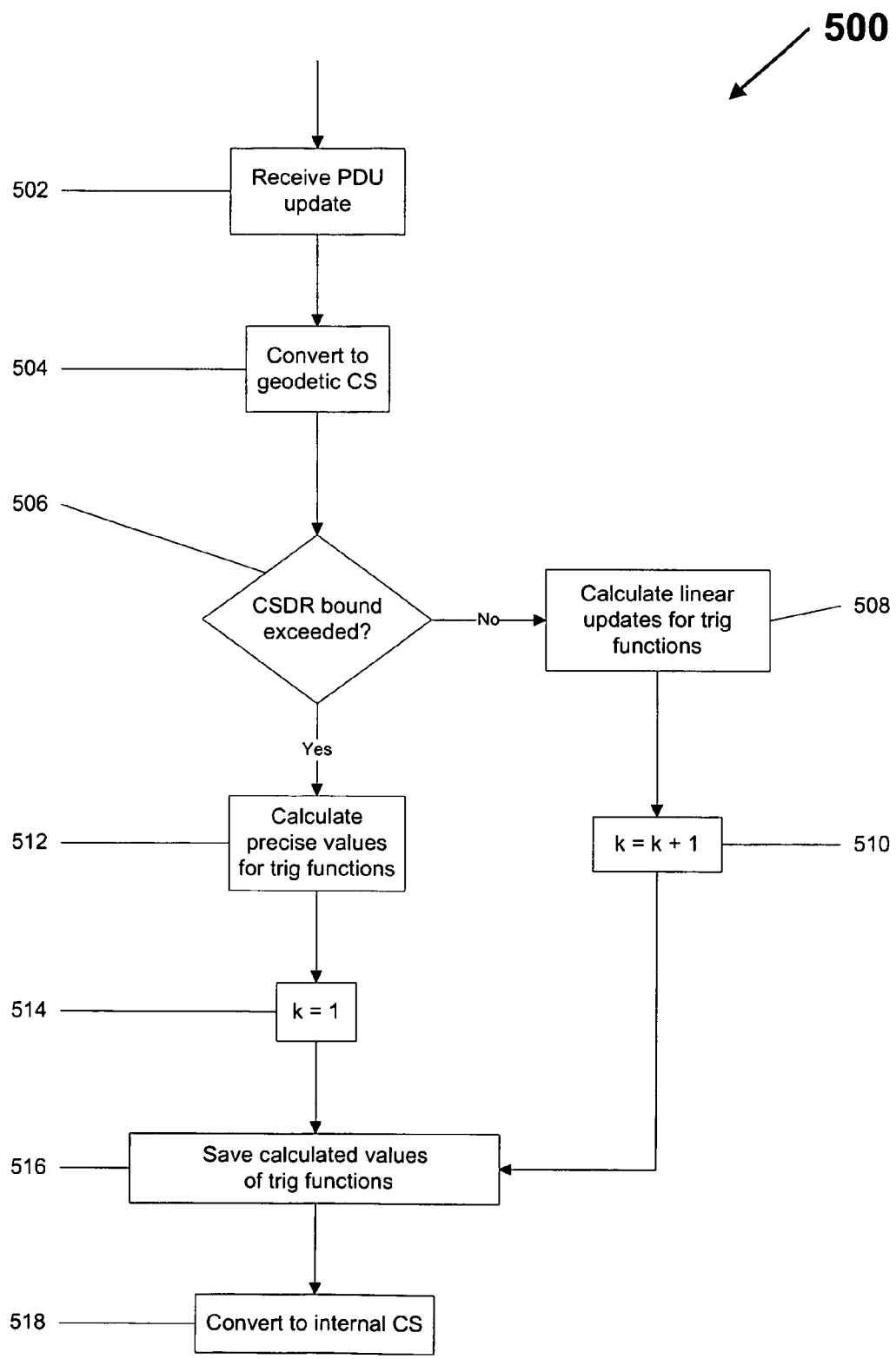
FIG. 5 shows a flowchart illustrating a reverse conversion of coordinates in accordance with the present invention.

FIG. 5 shows a flowchart that illustrates how the present invention can be advantageously utilized in a process 500 for converting geocentric coordinates to internal coordinates on a non-owning node. In step 502, a PDU update containing geocentric coordinates is received at the non-owning node. In step 504 the geocentric coordinates are converted to geodetic coordinates. In step 506, the process 500 determines whether the geodetic coordinates exceed the CSDR bound. If the CSDR bound is not exceeded, then the process 500 proceeds to step 508, wherein values of trigonometric functions are calculated from saved values of the trigonometric functions using linear approximations of the trigonometric functions. After completion of step 508, the value of k is incremented in step 510. After step 510, the process 500 proceeds to step 516. If the CSDR bound is exceeded in step 506, the process 500 proceeds to step 512, wherein values of the trigonometric functions are calculated using precise approximations of the trigonometric functions. After step 512, the value of k is reset to 1 in step 514 and the process 500 proceeds to step 516. In step 516, the calculated values of the trigonometric functions as well as the values of $\lambda$ and $\phi$ are saved for use, if needed, during the next iteration of the process 500. After step 516, the process 500 proceeds to step 518 wherein the calculated values of the trigonometric functions are used to convert the geodetic coordinates to coordinates in the internal coordinate system.

Embodiments of the present invention such as simulation systems and nodes in simulation systems, for example, comprise operable logic configured to perform methods of the present invention. In this manner, nodes in simulation systems of the present invention are adapted to perform the methods of the present invention. These methods may include, for example, performing dead-reckoning bounds checks, performing CSDR bounds check, calculating values of trigonometric functions, and saving calculated values for future use by methods of the present invention. In other words, the operable logic executes the methods of the present invention.

The operable logic of the present invention can be implemented as a set of computer program instructions that are stored in a computer-readable medium and executed by an embedded microprocessor system within devices and systems made in accordance with the present invention. Embodiments of the invention may be implemented, in whole or in part, in any conventional computer programming language. For example, preferred embodiments may be implemented in a procedural programming language (for example, "C") or an object oriented programming language (for example, "C++"). Alternate embodiments of the invention may be implemented, in whole or in part, utilizing discrete components, integrated circuitry, programmable logic used in conjunction with a programmable logic device such as a Field Programmable Gate Array (FPGA) or microprocessor, or any other means including any combination thereof. Additional embodiments of the invention may be implemented, in whole or in part, as a computer program product for use with a computer system. Such implementation may include a series of computer instructions fixed either on a tangible medium, such as a computer-readable storage media (for example, a diskette, CD-ROM, ROM, or fixed disk) The medium may be either a tangible medium (e.g., optical or analog communications lines) or a medium implemented with wireless techniques (e.g., microwave, infrared or other transmission techniques). The series of computer instructions embodies all or part of the functionality described herein with respect to the present invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over a network (for example, the Internet or World Wide Web).

In accordance with the present invention, novel methods for converting a position in one coordinate system to another coordinate system are provided that are useful in distributed simulation systems, for example. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A computer-executed method for converting coordinates for a position of an entity from a first coordinate system to a second coordinate system, comprising:
    determining by a computer processor whether the coordinates for the position of the entity in the first coordinate system are within a predetermined bound;
    calculating by the computer processor a value of at least one trigonometric function from a previously-saved value of the at least one trigonometric function using a linear approximation of the at least one trigonometric function when the coordinates for the position of the entity in the first coordinate system are within the predetermined bound; and
    determining by the computer processor coordinates for the position of the entity in the second coordinate system from the calculated value.

2. The method of claim 1, wherein the at least one trigonometric function is selected from the group consisting of a sine function and a cosine function.

3. The method of claim 1, wherein the first coordinate system is a geodetic coordinate system, the coordinates for the position of the entity including latitude and longitude.

4. The method of claim 3, wherein the calculated value is selected from the group consisting of a value for the sine of the position's latitude, a value for the cosine of the position's latitude, a value for the sine of the position's longitude, and a value for the cosine of the position's longitude.

5. The method of claim 3, wherein the second coordinate system is a geocentric coordinate system.

6. The method of claim 3, wherein the second coordinate system is an Augmented Universal Transverse Mercator coordinate system.

7. A computer-readable storage medium storing an executable program and a computer processor executing the executable program for performing a method for converting coordinates for a position of an entity from a first coordinate system to a second coordinate system, the method comprising:
    determining by the computer processor whether the coordinates for the position of the entity in the first coordinate system are within a predetermined bound;
    calculating by the computer processor a value of at least one trigonometric function from a previously-saved value of the at least one trigonometric function using a linear approximation of the at least one trigonometric function when the coordinates for the position of the entity in the first coordinate system are within the predetermined bound; and
    determining by the computer processor coordinates for the position of the entity in the second coordinate system from the calculated value.

8. The medium of claim 7, wherein the at least one trigonometric function is selected from the group consisting of a sine function and a cosine function.

9. The medium of claim 7, wherein the first coordinate system is a geodetic coordinate system, the coordinates for the position of the entity including latitude and longitude.

10. The medium of claim 9, wherein the calculated value is selected from the group consisting of a value for the sine of the position's latitude, a value for the cosine of the position's latitude, a value for the sine of the position's longitude, and a value for the cosine of the position's longitude.

11. The medium of claim 9, wherein the second coordinate system is a geocentric coordinate system.

12. The medium of claim 9, wherein the second coordinate system is an Augmented Universal Transverse Mercator coordinate system.

13. A computer-executed method for communicating a position of an entity on a first node in a simulation system to a second node, comprising:
    converting, by a computer processor of the first node, coordinates for the position of the entity from a first coordinate system to a second coordinate system by:
        determining by the computer processor whether the coordinates for the position of the entity in the first coordinate system are within a predetermined bound;
        calculating by the computer processor a value for at least one trigonometric function from a previously-saved value of the at least one trigonometric function using a linear approximation of the at least one trigonometric function when the coordinates for the position of the entity in the first coordinate system are within the predetermined bound; and
        determining by the computer processor coordinates for the position of the entity in the second coordinate system from the calculated value; and
    sending the converted coordinates for the position of the entity from the first node to the second node.

14. The method of claim 13, wherein the at least one trigonometric function is selected from the group consisting of a sine function and a cosine function.

15. The method of claim 14, wherein the first coordinate system is a geodetic coordinate system, the geodetic coordinates of the position including latitude and longitude, and wherein the second coordinate system is a geocentric coordinate system.

16. The method of claim 15, wherein the calculated value is selected from the group consisting of a value for the sine of the position's latitude, a value for the cosine of the position's latitude, a value for the sine of the position's longitude, and a value for the cosine of the position's longitude.

17. The method of claim 16, further comprising:
    converting, on the second node, the sent coordinates for the position of the entity to a third coordinate system by:
        determining whether the sent coordinates for the position of the entity are within a predetermined bound;
        calculating a value for at least one trigonometric function from a previously-saved value of the at least one trigonometric function using a linear approximation of the at least one trigonometric function when the sent coordinates for the position of the entity are within the predetermined bound; and
        determining coordinates in the third coordinate system from the calculated value.

18. The method of claim 17, wherein the third coordinate system is an Augmented Universal Transverse Mercator coordinate system.

19. A computer-readable storage medium storing an executable program and a computer processor executing the executable program for performing a method for communicating a position of an entity on a first node in a simulation system to a second node, the method comprising:
converting, by the computer processor of the first node executing the executable program, coordinates for the position of the entity from a first coordinate system to a second coordinate system by:
determining by the computer processor whether the coordinates for the position of the entity in the first coordinate system are within a predetermined bound;
calculating by the computer processor a value for at least one trigonometric function from a previously-saved value of the at least one trigonometric function using a linear approximation of the at least one trigonometric function when the coordinates for the position of the entity in the first coordinate system are within the predetermined bound; and
determining by the computer processor coordinates for the position of the entity in the second coordinate system from the calculated value; and
sending the converted coordinates for the position of the entity from the first node to the second node.

20. The medium of claim 19, wherein the at least one trigonometric function is selected from the group consisting of a sine function and a cosine function.

21. The medium of claim 20, wherein the first coordinate system is a geodetic coordinate system, the geodetic coordinates of the position including latitude and longitude, and wherein the second coordinate system is a geocentric coordinate system.

22. The medium of claim 21, wherein the calculated value is selected from the group consisting of a value for the sine of the position's latitude, a value for the cosine of the position's latitude, a value for the sine of the position's longitude, and a value for the cosine of the position's longitude.

23. The medium of claim 22, wherein the method further comprises:
converting, on the second node, the sent coordinates for the position of the entity to a third coordinate system by:
determining whether the sent coordinates for the position of the entity are within a predetermined bound;
calculating a value for at least one trigonometric function from a previously-saved value of the at least one trigonometric function using a linear approximation of the at least one trigonometric function when the sent coordinates for the position of the entity are within the predetermined bound; and
determining coordinates in the third coordinate system from the calculated value.

24. The medium of claim 23, wherein the third coordinate system is an Augmented Universal Transverse Mercator coordinate system.

25. A node in a simulation system comprising a computer processor to:
convert coordinates for a position of an entity from a first coordinate system to a second coordinate system by:
determining by the computer processor of the node whether the coordinates for the position of the entity in the first coordinate system are within a predetermined bound;
calculating by the computer processor of the node a value for at least one trigonometric function from a previously-saved value of the at least one trigonometric function using a linear approximation of the at least one trigonometric function when the coordinates for the position of the entity in the first coordinate system are within the predetermined bound; and
determining by the computer processor of the node coordinates for the position of the entity in the second coordinate system from the calculated value.

26. The node of claim 25, wherein the at least one trigonometric function is selected from the group consisting of a sine function and a cosine function.

27. The node of claim 26, wherein the first coordinate system is a geodetic coordinate system, the geodetic coordinates of the position including latitude and longitude, and wherein the second coordinate system is a geocentric coordinate system.

28. The node of claim 27, wherein the calculated value is selected from the group consisting of a value for the sine of the position's latitude, a value for the cosine of the position's latitude, a value for the sine of the position's longitude, and a value for the cosine of the position's longitude.

29. A distributed simulation system, comprising:
a first node comprising a computer processor adapted to:
convert coordinates for a position of an entity from a first coordinate system to a second coordinate system by:
determining whether the coordinates for the position of the entity in the first coordinate system are within a predetermined bound;
calculating a value for at least one trigonometric function from a previously-saved value of the at least one trigonometric function using a linear approximation of the at least one trigonometric function when the coordinates for the position of the entity in the first coordinate system are within the predetermined bound; and
determining coordinates for the position of the entity in the second coordinate system from the calculated value; and
send the coordinates for the position of the entity in the second coordinate system to another node in the system; and
a second node comprising a computer processor adapted to:
receive the coordinates for the position of the entity in the second coordinate system from the first node; and
convert the received coordinates for the position of the entity to a third coordinate system by:
determining whether the received coordinates for the position of the entity are within a predetermined bound;
calculating a value for at least one trigonometric function from a previously-saved value of the at least one trigonometric function using a linear approximation of the at least one trigonometric function when the received coordinates for the position of the entity are within the predetermined bound; and
determining coordinates for the position of the entity in the third coordinate system from the calculated value.

30. The system of claim 29, wherein the at least one trigonometric function is selected from the group consisting of a sine function and a cosine function.

31. The system of claim 30, wherein the first coordinate system is a geodetic coordinate system, the geodetic coordinates of the position including latitude and longitude, and wherein the second coordinate system is a geocentric coordinate system.

32. The system of claim 31, wherein the calculated value is selected from the group consisting of a value for the sine of the position's latitude, a value for the cosine of the position's latitude, a value for the sine of the position's longitude, and a value for the cosine of the position's longitude.

33. The system of claim 29, wherein the third coordinate system is an Augmented Universal Transverse Mercator coordinate system.

* * * * *